United States Patent
Rice

(10) Patent No.: US 7,693,273 B2
(45) Date of Patent: Apr. 6, 2010

(54) NETWORK MAINTENANCE

(75) Inventor: Douglas H Rice, Kesgrave (GB)

(73) Assignee: British Telecommunications plc, London (GB)

( * ) Notice: Subject to any disclaimer, the term of this patent is extended or adjusted under 35 U.S.C. 154(b) by 1037 days.

(21) Appl. No.: 10/503,055

(22) PCT Filed: Feb. 20, 2003

(86) PCT No.: PCT/GB03/00728

§ 371 (c)(1),
(2), (4) Date: Jul. 30, 2004

(87) PCT Pub. No.: WO03/071814

PCT Pub. Date: Aug. 28, 2003

(65) Prior Publication Data

US 2005/0084092 A1    Apr. 21, 2005

(30) Foreign Application Priority Data

Feb. 20, 2002    (EP)    .................................. 02251175

(51) Int. Cl.
H04M 7/00    (2006.01)
(52) U.S. Cl. .............. 379/229; 379/221.01; 379/221.04
(58) Field of Classification Search ................. 379/229, 379/221.01, 221.04, 1.01
See application file for complete search history.

(56) References Cited

U.S. PATENT DOCUMENTS

| 6,014,557 | A | * | 1/2000 | Morton et al. | ............... | 455/410 |
| 6,058,182 | A | * | 5/2000 | Corso et al. | ................. | 379/279 |
| 2002/0004816 | A1 | * | 1/2002 | Vange et al. | ................. | 709/202 |
| 2003/0225875 | A1 | * | 12/2003 | Revanuru et al. | ........... | 709/223 |

FOREIGN PATENT DOCUMENTS

| EP | 0 926 908 | 6/1999 |
| WO | WO 98/51095 | 11/1998 |

* cited by examiner

Primary Examiner—Rasha S Al Aubaidi
(74) Attorney, Agent, or Firm—Nixon & Vanderhye PC

(57) ABSTRACT

A method of signalling in an AIN, in which in an SSP, the initial message of a new transaction is addressed to a Service Global Title (SGT). The SSP translates that SGT to a first address of the first choice SCP. The SCP responds with an acknowledgement message which has a second address of the SCP as its source address, and includes the Nodal Global Title (NGT) of that SCP. The SSP sends subsequent messages for that transaction addressed to that NGT, and the SSP translates that NGT to the second address of the SCP. When the SCP is taken out of service, the first address is made unavailable, so the SSP sends new initial messages to the second choice SCP, but subsequent messages for existing transactions may still be sent to the second address of the first choice SCP. When all existing transactions have ceased, the SCP is taken out of service.

10 Claims, 2 Drawing Sheets

NETWORK MAINTENANCE

This application is the US national phase of international application PCT/GB03/00728 filed 20Feb. 2003 which designated the U.S. and claims benefit of EP 02251175.2, dated 20 Feb. 2002, the entire content of which is hereby incorporated by reference.

BACKGROUND

1. Technical Field

The present invention relates to maintenance of network units, and particularly, but not exclusively, to graceful shutdown of units in intelligent networks, particularly intelligent networks known in the art as Advanced Intelligent Networks (AINs).

2. Related Art

In an AIN, when it is decided to take a service control point (SCP) out of service, the known methods cause that SCP instantly to disable its message input/output subsystem, with the result that transactions that are currently being processed by that SCP, and their associated service switching points (SSPs), cannot complete their normal message sequences, and are left to timeout in the absence of expected response messages.

Not only are SCPs involved in relatively short-term transactions for, e.g. Number Translation services, where an SSP sends dialled digits to an SCP and requests translation to a network destination number, but they are also involved in relatively long-term transactions of many minutes. In the example of queuing of calls to agents at a call centre when all agents are busy, for each new call made to the call centre, the SCP requests the SSP to connect that call to a voice response unit (VRU), which plays out music. Such a call connected to the VRU is given a new transaction and the SCP requests the SSP to arm for "Disconnect, Notify and continue", as is known in the art, so that the SCP will be told if the caller clears and thus be able to terminate the corresponding transaction and delete that call from its list of queued calls. When an agent becomes free the SSP notifies the SCP and that transaction ends. The SCP then selects a queued call and requests the SSP to disconnect the caller from the VRU and connect that call to the free agent. The transaction for that call remains open until the call ends. Thus for calls to a large call centre the SCP could be maintaining many tens of transactions in respect of queued calls at any one time. In another example, the SCP maintains transactions after call establishment, for calls where the parties can invoke one or more special services, such as call transfer.

Thus, for those known methods, not only will there be failure of calls where, e.g. an SCP is managing a queue, but special service requests would fail. There is thud considerable potential for annoyance to many customers.

BRIEF SUMMARY

In accordance with a first aspect of the present invention, there is provided in a communications network wherein a new transaction for a function of that network is processed by a unit selected from a respective pool of identical function-related units having a service status of in-service (IS), a method of changing the service status of such a unit to out-of-service (OOS), the method comprising the steps:

consequent upon a decision to change the service status of such a unit from IS to OOS, marking that unit as unavailable for processing of a new transaction in accordance with that function;

whilst that unit is so marked, continuing with any existing transactions being processed by that unit at the time of the marking; and changing the service status of that unit from IS to OOS upon detecting that all such existing transactions being processed by that unit at the time of the marking have finished.

In an AIN, this method of the present invention enables messages to continue to be sent from the SSP to the SCP, and vice versa, for all existing transactions, and they will continue until terminated in the normal manner in accordance with the associated function. Furthermore, this method of the present invention prevents any new transactions from being processed by the SCP, and the SCP is then taken out of service for maintenance when it ceases to have any existing transactions to process. Thus, no existing transaction will be terminated by failure to receive a response message within a timeout, and the previous annoyance is avoided.

Preferably, signalling messages in respect of new transactions in accordance with the associated function are received at a first network address of that unit and signalling messages in respect of existing transactions in accordance with the associated function are received at a second network address of that unit.

More preferably, the signalling messages are sent from other units of the network, and wherein the marking step comprises sending a message to the other units indicating that the first network address is not available.

The first and second network addresses of that unit may be in the form of a common Internet Protocol address of that unit together with respective port addresses.

In accordance with a second aspect of the present invention, there is provided a unit for use in a communications network for processing transactions in accordance with a specific function, the unit comprising:

means responsive to a requirement for a change of service status of the unit from in service (IS) to out of service (OOS) for marking the unit as unavailable for processing of a new transaction in accordance with that function;

means for detecting that the unit is actually or effectively not currently processing any transactions; and means responsive to such a detection by the detecting means for changing the service status of the unit from IS to OOS.

Preferably, the unit comprises means for receiving signalling messages in respect of new transactions in accordance with said associated function at a first network address of the said unit and means for receiving signalling messages in respect of existing transactions in accordance with said associated function at a second network address of the said unit.

BRIEF DESCRIPTION OF THE DRAWINGS

Specific embodiments of the present invention will now be described by way of example with reference to the drawings in which.

DETAILED DESCRIPTION OF EXEMPLARY EMBODIMENTS

Figure 1:
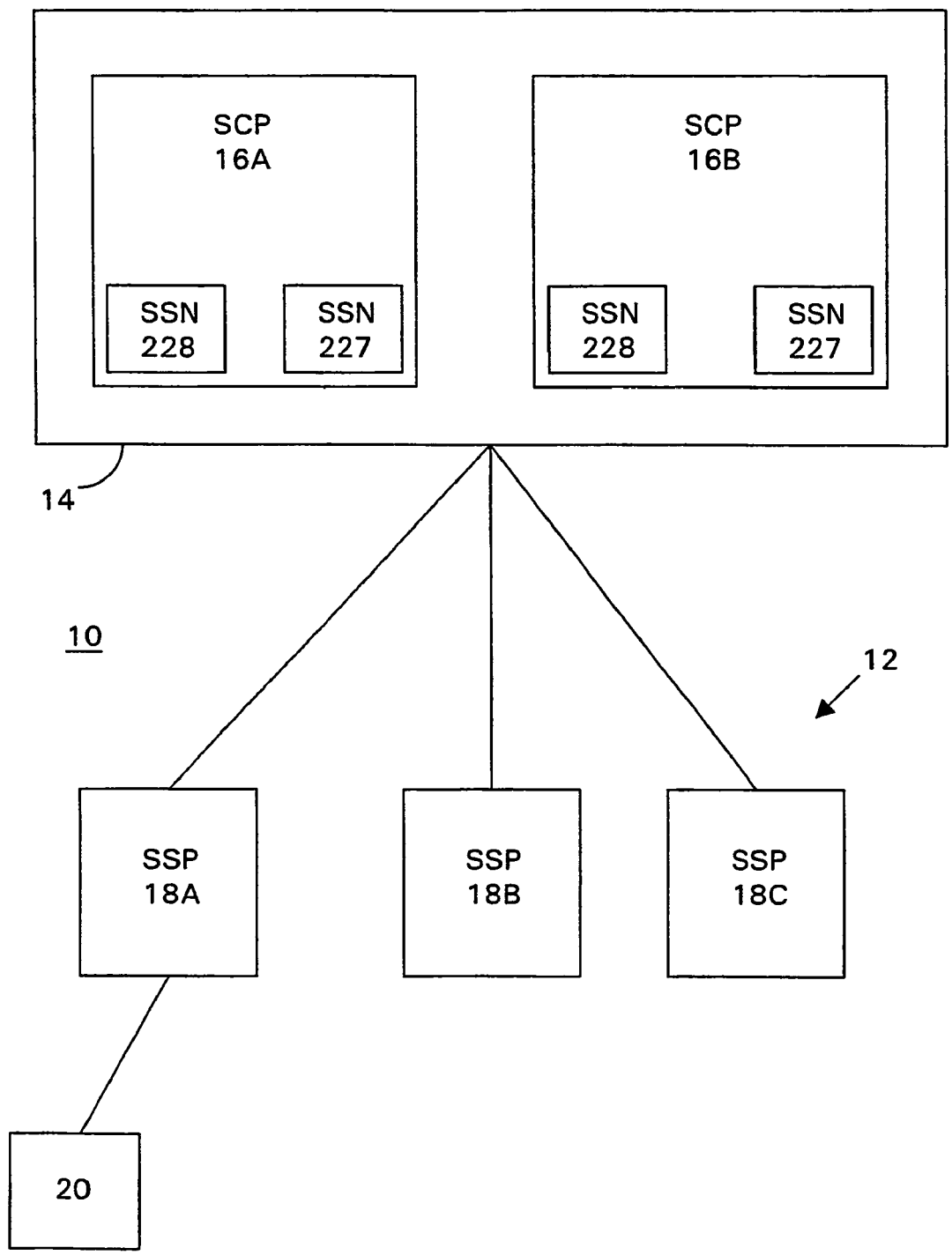
FIG. 1 is a block schematic diagram of elements of an Advanced Intelligent Network.

In FIG. 1 there is shown part of an Advanced Intelligent Network (AIN) 10 comprising, inter alia, a service switching function (SSF) 12 and a service control function (SCF) 14.

The SSF 12 comprises a plurality of service switching points (SSPs) 18, only three of which are shown, SSPs 18A, 18B and 18C, and each SSP 18 is connected to a plurality of network terminals 20, but for convenience only one terminal 20 is shown connected to SSP 18A. Each SSP has a unique Nodal Global Title and a corresponding point code, as is known in the art.

The SCF 14 comprises a plurality of service control points (SCPs) 16. The number of SCPs will depend upon the size of the AIN 10. In FIG. 1, for convenience, only one pair of SCPs is shown, namely SCPs 16A and 16B, these being designated first choice and second choice SCPs for a non-geographic Number Translation Service referred to "0800" service. The SCPs 16A and 16B may also be first choice and second choice SCPs for other services, but for the purpose of the present invention only the "0800" service will be referred to.

Each of the SSPs 18 and the SCPs 16 constitutes a unit of the AIN 10 in accordance with the present invention; each has a unique Nodal Global Title and a corresponding point code, as is known in the art; and each has a service status which can be one of a plurality of statuses including in service (IS) and out of service (OOS).

The SCPs 16A and 16B are both associated with a Service Global Title corresponding to the "0800" service, since both SCPs provide this service function to the SSPs. The SCP 16A is designated as the preferred (first choice) SCP over the SCP 16B (second choice), but if SCP 16A is OOS the SCP 16B is used to provide service. Each transaction may be processed only by the SCP on which it is started, i.e. it is not permitted for a transaction, once started on one of the SCPs, to be transferred to the other SCP. Each SCP has the capability of processing a plurality of concurrent transactions.

In the description below of a new call involving SSP 18A and the SCPs 16A and 16B, the point code of SSP 18A is 8508, the point code of SCP 16A is 8350, and the point code of SCP 16B is 8229. As is known in the art, point codes uniquely identify sources and destinations for signalling messages in a signalling network.

Each of the SCPs 16A, 16B, has a first and a second subsystem for reception of signalling messages from the SSPs 18. Each of the first subsystems has a subsystem number (SSN) 228, and each of the second subsystems has a subsystem number (SSN) 227.

The first subsystem, referred to hereafter as SSN 228 is for reception of the initial message of a new transaction, and the second subsystem, referred to hereafter as SSN 227, is for reception of subsequent messages of existing transactions, i.e. all messages other than an initial message. The SSNs 228 and 227 respectively constitute first and second network addresses of the present invention.

Figure 2:
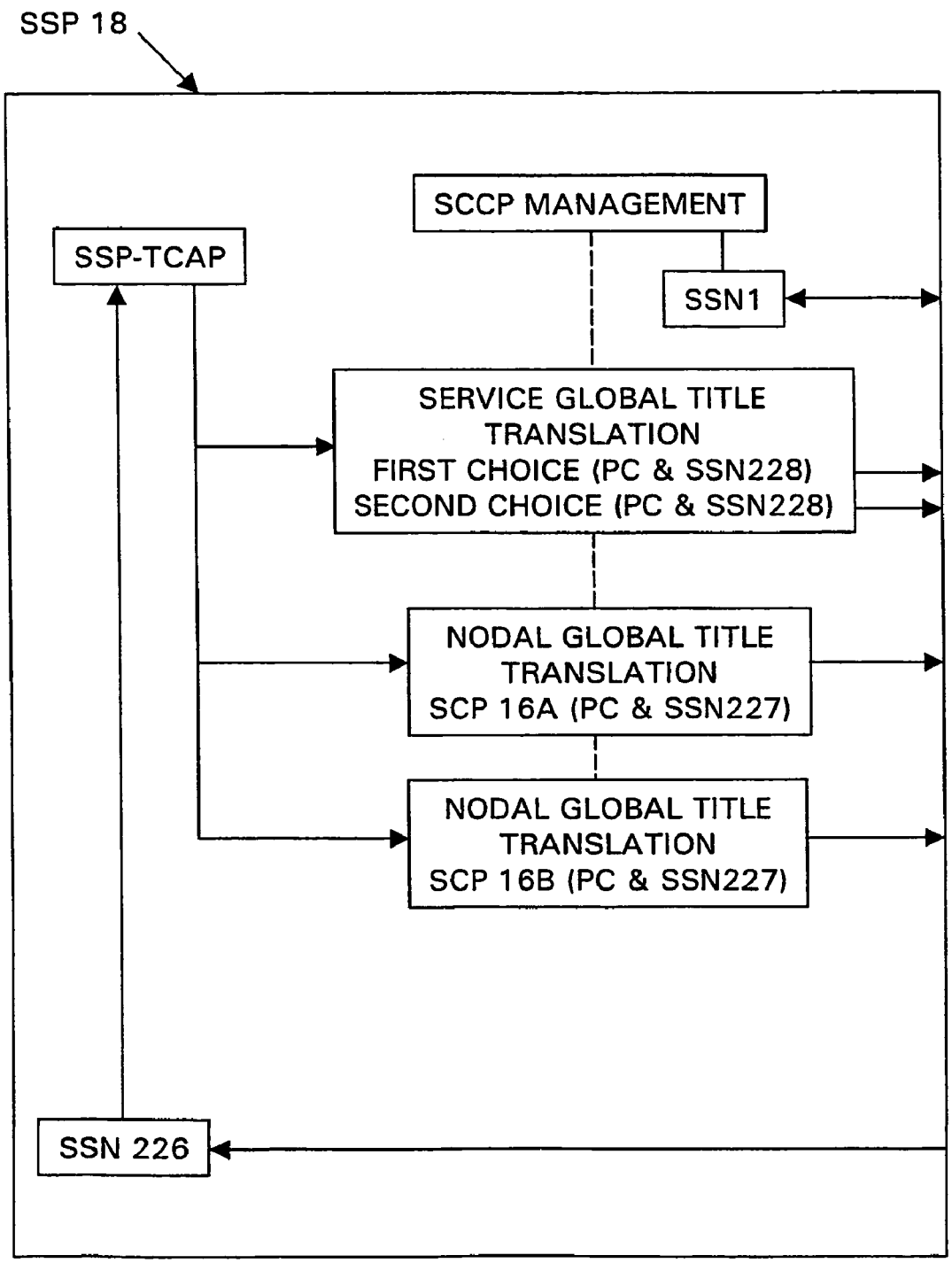
FIG. 2 is a block schematic diagram of elements of a service switching point of the network of FIG. 1.

Referring now to FIG. 2, each of the SSPs 18 has a subsystem, SSN 226, for reception of messages from SCPs, and also has a Transaction Capabilities Application Part, referred to as SSP-TCAP, which receives messages from the SSN 226; a signalling connection control part (SSP-SCCP) translator, described in detail below, controlled by an SSP-SCCP management which communicates with other units of the AIN via a subsystem allocated the subsystem number 1, i.e. SSN 1; and a Message Transfer Part (MTP) which provides the actual transport layer and which is not shown or described in detail as it is not germane to the present invention. The SSP-SCCP management receives SCCP management messages from corresponding SCP-SCCP managements of the SCPs 16 advising of changes to their availability, and accordingly maintains availability indicators of translation tables of the SSP-SCCP translator, i.e. which point codes and remote SSNs are available or in other words have an IS status.

When a new call, say a telephony call, is originated at the network terminal 20, its local SSP 18A responds by starting a telephony call handling application for telephony service, and allocating memory to create a new Transaction Instance.

Assume that this new call is not a local call, but is one which requires handling by an SCP, e.g. the calling party has dialled an "0800" number which requires number translation, i.e. one of a group of services known as non-geographic Number Translation Services. The application is designed to detect the occurrence of particular events during calls, known in the art as event detection points (EDPs), of which this is one, and upon recognition of such an event, initiates special handling of the call by the AIN 10, and in the art, this is referred to as triggering of the call, and the associated data is referred to as the trigger data.

The telephony call handling application sends to the SSP-TCAP an initial message containing the Service Global Title corresponding to the trigger data, and Intelligent Network Applications Part (INAP) components including, inter alia, a Service Key, the calling line identity (CLI) of the network terminal from which the call was made, the called party number, i.e. the actual "0800" number dialled at the originating network terminal 20, and the Initial Detection Point (IDP).

Upon receipt of that initial message, the SSP-TCAP generates a corresponding TCAP message having a TCAP Label including the message type BEGIN (more properly referred to as the TCAP_BEGIN indication dialogue primitive) and a unique SSP-SCP Origination Transaction identity (ID), and passes the TCAP message to the SSP-SCCP translator.

The SSP-SCCP translator has two parts. The first part (Service Global Title Translation) comprises, for each network service (Service Global Title), a respective translation table for translating a Service Global Title (in the form of the combination of a Global Title address information byte(s) and an associated Numbering Plan indicator, described more fully below) to destination data (in the form of a point code/SSN pair) of current first choice and second choice SCPs, i.e. from Service Global Title to SCP point code and associated SSN. The point code/SSN pairs in the translation table of this first part have the common SSN 228. These first and second choices are also known as primary and secondary remote point codes (RPCs).

The second part (Nodal Global Title Translation) of the SSP-SCCP translator comprises, for each Service Global Title, a respective pair of tables for translating Nodal Global Title to a corresponding point code/SSN pair. Every point code/SSN pair of this second part has the same, common SSN 227. In this specific embodiment, the tables of the second part are physically identical to those of the first part, for reasons given below. They differ only in the data values in the tables, and may be one and the same table. Thus, in the tables of the second part, the first choice point code is the point code allocated to the corresponding SCP, and the second choice point code is NULL.

In general, the function of the SSP-SCCP translator is to encapsulate each received TCAP message as the payload of a corresponding SCCP message for transmission to the appropriate SCP. Before proceeding with a description of the operation of the SSP-SCCP translator, the structure of such a SCCP message will described.

The SCCP message comprises a TCAP message payload and an SCCP Label having a Called Party Address part and a Calling Party Address part. The payload is referred to in the art as the data parameter of the SCCP message.

The Called Party Address part contains a Called Party Address Indicator parameter (eight bits in length) and optional data fields. With regard to the present invention, the relevant bits of the parameter are the least significant (first) bit (Point Code Indicator), which indicates presence/absence of valid data in a point code field, the next (second) bit (SSN Indicator) which indicates presence/absence of valid data in an SSN field, the third to sixth bits which are referred to as the Global Title Indicator, and the seventh bit (referred to as the Routing Indicator), which if set to the value 1 indicates that routing is to be on the basis of SSN and which if set to the value 0 indicates that routing is to be on the basis of Global Title.

The Calling Party Address part has the same structure as the Called Party Address part.

Proceeding now with a description of the operation of the SSP-SCCP translator, the SSP-SCCP translator retrieves the content of a destination point code field of the received initial TCAP message. If this were other than the NULL value, the SSP-SCCP translator would use this point code directly as the AIN network destination address, without needing to perform any translation. However, for all initial TCAP messages, this destination point code field is set to the NULL value, so the SSP-SCCP translator retrieves a Global Title from the received initial TCAP message. This Global Title includes a Translation Type (one byte), a Numbering Plan indicator (one nibble), an Encoding Scheme indicator (one nibble) a Nature of Address indicator (one byte), and Global Title address information (one or more bytes).

If the Numbering Plan indicator field is set to 1011 (decimal 11), this indicates that the Global Title fields contain a Service Global Title, and if the Numbering Plan indicator field is set to 1010 (decimal 10), this indicates that the Global Title fields contain a Nodal Global Title. Each initial TCAP message will contain a Service Global Title.

The SSP-SCCP translator now uses the combination of the Global Title address information byte(s) and the Numbering Plan indicator to access the translation table of its first part. If this combination matches a stored combination, the SSP-SCCP translator retrieves the corresponding first choice point code/SSN pair, if its associated availability indicator is set to one, or, if not, retrieves the corresponding second choice point code/SSN pair. In the event that neither the first choice SCP 16A nor the second choice SCP 16B is available, the SSP-SCCP translator returns a Transaction Failed message to the SSP-TCAP. Such a Failed message is also returned if the Numbering Plan indicator field does not have the value 1011 (decimal 11), i.e. the SSP-SCCP translator fails to find a match with a stored value, it being appreciated that the first part (Service) table only has entries in which the Numbering Plan indicator has the value 1011.

Assuming that the first choice SCP 16A (point code/SSN pair=8350/228) is available, the SSP-SCCP translator now constructs an SCCP Called Party Address part as follows. It populates the SSN field with the data value 228, and the Global Title fields with a copy of the Global Title retrieved from the received initial TCAP message. It also sets the bits of the Called Party Address Indicator parameter as follows: least significant (first) bit to zero (point code absent), the second bit to one (SSN present—228), and the seventh bit, the Routing Indicator, to one (route on SSN). In this embodiment, the Global Title Indicator is permanently set to 0100 (referred to as Global Title type 4), which indicates that the Global Title includes a Translation Type (one byte), a Numbering Plan indicator (one nibble), an Encoding Scheme indicator (one nibble) a Nature of Address indicator (one byte), and Global Title address information (one or more bytes).

The SSP-SCCP translator also constructs an SCCP Calling Party Address. It populates the SSN field with the data value 226, and the Global Title fields with the Nodal Global Title of the SSP 18A. It also sets the bits of the Calling Party Address Indicator parameter as follows: least significant (first) bit to zero (point code absent), the second bit to one (SSN present—226), the Global Title Indicator to 0100, and the seventh bit, the Routing Indicator, to zero (route on Global Title).

In subsequent SSP-SCCP messages, the Global Title fields of the Called Party Address part contain the Nodal Global Title of the SCP 16A, including a Numbering Plan indicator of 1010 (decimal 10) to indicate that the Title field contains a Nodal Global Title.

The SSP-SCCP translator now sends to the MTP transport layer this initial SCCP message together with data values, say, 2, 8508 and 8350, for respectively populating a Signalling Link Selection (SLS) field, an Originating Point Code (OPC) field and a Destination Point Code (DPC) field of the Routing Label of a corresponding MTP message.

It will be appreciated that whereas the TCAP Label of the initial TCAP message contains a TCAP_BEGIN indication dialogue primitive, subsequent messages for that transaction will contain, as appropriate, a TCAP_CONTINUE, TCAP_END or TCAP ABORT indication dialogue primitive.

Considering now actions at the SCPs, but particularly the SCP 16A, since the SSP 18A has selected this SCP as the first choice SCP for this particular transaction. Each of the SCPs 16A and 16B has a respective corresponding SCP-SCCP translator for translating Nodal Global Titles of the SSPs 18 to corresponding point code/SSN pairs. This is functionally the same as the second part of the SSP-SCCP translator and will not be described further.

On reception at the MTP transport layer of the SCP 16A, the MTP Label is stripped off and the SCCP message is sent to the SCP-SCCP translator which, in accordance with the Routing Indicator (Route on SSN) and SSN field (228) in the Called Party Address part, sends the TCAP payload message and the Calling Party Address part from the received SCCP Label to the indicated SSN (228).

The SCP-TCAP receives the message and the Calling Party Address part from the received SCCP Label, responds to the TCAP_BEGIN Message Type by allocating memory to create a Transaction Instance. The SCP-TCAP now stores within this memory, the Calling Party Address part from the received SCCP Label for use with associated messages to be sent to the SSP 18A, the Origination Transaction ID contained within the TCAP_BEGIN message, and an SCP-TCAP generated Destination Transaction ID. Finally, the SCP-TCAP passes the INAP message to the appropriate non-geographic Number Translation Service application at the SCP 16A.

This application generates an acknowledgement message, sends this acknowledgement message to the appropriate Transaction Instance at the SCP-TCAP, which inserts into the TCAP Label the Destination Transaction ID and the Origination Transaction ID using rules known in the art, and sends the acknowledgement message to the SCP-SCCP translator. This transaction can now uniquely identified by the combination of the Origination Transaction ID and the Destination Transaction ID.

When SCP-SCCP translator receives the acknowledgement message it refers to the stored SCCP Calling Party Address part, and constructs a new Called Party Address part. In this specific example of an "0800" call, the stored SCCP Calling Party Address part does not contain a point code, so the SCP-SCCP translator now translates the Global Title contained in this Calling Party Address part, which is the Nodal Global Title of the SSP 18A.

The SCP-SCCP translator uses the combination of the Global Title address information byte(s) and the Numbering Plan indicator to access its translation table.

If this combination matches a stored combination, the SSP-SCCP translator retrieves the corresponding "first" choice point code/SSN pair, provided that its associated availability indicator is set to one. In the (unlikely) event that the "first" choice SSP 18A is not available, the SCP-SCCP translator returns a Transaction Failed message to the SCP-TCAP. Such a Failed message is also returned if the Numbering Plan indicator field does not have the value 1010 (decimal 10), i.e. the SCP-SCCP translator fails to find a match with a stored value, it being appreciated that its translation table only has entries in which the Numbering Plan indicator has the value 1010. As explained above, the Nodal Global Title translation tables have the same structure as the Service Global Title translation tables, but as they are used to translate only to a single point code/SSN pair, only the first choice storage locations of the table are used, and the second choice storage locations contain NULL values.

In this example, the SCP-SCCP translator does find a match, and retrieves the point code/SSN pair corresponding to the SSP 18A, 8508/226.

The SCP-SCCP translator now constructs an SCCP Called Party Address part and populates its SSN field with the data value 226 and its Global Title fields with a copy of the Nodal Global Title retrieved from the stored Calling Party Address part. It also sets the Routing Indicator to 1 (route on SSN). It will use the point code data value 8508 when passing the SCCP acknowledgement message to the SCP-TCAP.

The SCP-SCCP translator also constructs an SCCP Calling Party Address and populates its SSN field with the data value 227 and its Global Title fields with its own Nodal Global Title (i.e. that of SCP 16A). It also sets the Routing Indicator to 0 (route on Global Title).

On reception at the MTP transport layer of the SSP 18A, the MTP Label is stripped off and the acknowledgement message is sent to the SSP-SCCP translator, which in similar manner to the procedure at the SCP 16A, stores the Calling Party Address part in the associated Transaction Instance memory at the SSP 18A for use for subsequent messages of this transaction, and sends the acknowledgement message to the indicated SSN (SSN 226) at the SSP-TCAP function of the SSP 18.

The SSP-TCAP receives the acknowledgement message, checks for its own Origination Transaction ID, captures the Destination Transaction ID and stores it with the Origination Transaction ID in the Transaction Instance memory, and sends the acknowledgement message to the Transaction Instance at the telephony service application at that subsystem, i.e. SSN 226, which then processes that acknowledgement message.

When subsequent messages of the current transaction are handled by SSP-SCCP, they will be identified as such by the TCAP message type CONTINUE (or in a variant, by the presence of a pair of transaction IDs). The SSP-SCCP will refer to the stored SCCP Calling Party Address part in the same manner that the SCP 16A referred to its stored SCCP Calling Party Address part for generating the acknowledgement message, and upon finding no point code data in the Calling Address part, it will retrieve the Nodal Global Title, i.e. of the SCP 16A, and use the second part of the SSP-SCCP translator to translate this to the point code/SSN pair, 8350/227. The SSP-SCCP translator will now take the TCAP (CONTINUE) message payload, generate a corresponding SCCP Label (in a similar manner to the SCP-SCCP translator as described above), attach the SCCP Label, and pass the resulting message to the MTP transport layer.

It will thus be appreciated that the SSP-SCCP translator performs a Service Global Title translation once and once only for the initial (BEGIN) message of a new transaction, i.e. it does not perform any Service Global Title translation for any subsequent message; and furthermore that it performs a Nodal Global Title translation for all such subsequent messages of the transaction.

It will be appreciated that the acknowledgement message contains the correct SSN which the SSP 18A could use for the destination SSN. However, in this embodiment it is advantageous to create the SCCP Labels for subsequent messages in the same manner as for the initial message. In this way, the Nodal Global Title translators of both the SSP-SCCP translator and the SCP-SCCP translator employ identical software to that of the Service Global Title translator of the SSP-SCCP translator, and this avoids the cost and development of special-purpose software for the Nodal Global Title translators, particularly considering that the SSPs are supplied from different manufacturers, e.g. System X exchanges from Marconi Limited and AXE 10 exchanges from Ericsson Telecommunications Limited, and have different proprietary SCCP translators and SCCP managements.

Assume now that it has been decided by an SCP management function, which might be a decision taken by network management personnel or by say a fault management program, to take SCP 16A out of service (OOS) for maintenance purposes. At the start of the turn off procedure, the SCP-SCCP management sends out, i.e. broadcasts, to all SSPs 18, via their respective SSN 1, an SCCP management message, SubSystemProhibited, containing the point code 8350 and the SSN 228, to prevent any new messages being sent to the subsystem 228. Thus, this SubSystemProhibited message constitutes a message of the present invention sent to all SSPs 18 indicating that the first network address of the SCP to be taken OOS is not available The sending of this SCCP management message constitutes marking the SCP 16A as unavailable for processing of new transactions.

In a variant, instead of broadcasting the SubSystemProhibited message, the SCP-SCCP management sends a marking message to a management function of the SCP 16A, which responds by changing to a service status of "in service, but unavailable for processing of new transactions" (ISUNT). In this service status, ISUNT, the SCP 16A rejects any new transaction received at its subsystem 228.

This variant also constitutes marking the SCP 16A as unavailable for processing of new transactions.

In a further variant, the SCP-SCCP management sends respective SubSystemProhibited messages to the SSPs 18, one at a time at a predetermined rate such as to reduce slowly the amount of new traffic being accepted by the SCP 16A.

On receipt of the SubSystemProhibited message at the SSPs 18, the SSP-SCCP management updates the translation tables of the first part of the SSP-SCCP translator (Service Global Title Translation) by changing the availability indicator of each entry of the SCP 16A to unavailable. In the present example, the SSP-SCCP translator will thus ignore the first choice SCP 16A and select the second choice SCP 16B (if that is available). The SCPs identify themselves in these SubSystemProhibited messages by their unique point codes.

In a variant, the SSP-SCCP management also interchanges the first and second choices, i.e. making the SCP 16B (point code/SSN pair=8229/228) the first choice for new telephone calls.

The SCP-SCCP management at the SCP 16A monitors the number of existing transactions being handled by the service application, and when that number falls to zero, the SCP-SCCP management changes the service status of the SCP 16A from IS to OOS. The SCP-SCCP management thus constitutes means responsive to a requirement for a change of service status of the SCP 16A from IS to OOS for marking the SCP 16A as unavailable for processing of a new transaction in accordance with the service application; means for detecting that the SCP 16A is actually not currently processing any transactions; and means responsive to such a detection by the detecting means for changing the service status of the SCP 16A from IS to OOS.

In a variant, at the start of the turn off procedure, the SCP-SCCP management sends out command messages to the SSPs to prevent the generation of initial (BEGIN) messages and starts a timeout which has been preset to the maximum allowable duration of transaction instances e.g. 10 minutes, and changes the service status of the SCP 16A from IS to OOS upon expiry of that timeout. In this variant, the SCP-SCCP management constitutes means for detecting that the SCP 16A is effectively not currently processing any transactions.

The present invention can also be implemented in networks using Internet Protocol (IP) addressing, by the use of port addressing. Thus, for a network using transmission control protocol IP (TCP/IP) the SCP 16A can have the IP address, say, 132.146.192.203, and the first subsystem can have the address 132.146.192.203.8080, so that port 8080 is targeted, and the second subsystem can have the address 132.146.192.203.2345, so that port 2345 is targeted.

The present invention can also be implemented in networks using User Datagram Protocol/Internet Protocol (UDP/I P).

In a further variant, instead of the above mentioned SubSystemProhibited messages, the SCP-SCCP management sends respective SubSystemCongestion messages to the SSPs 18, and the SSP-SCCP translators (first part) select either the SCP 16A or the SCP 16B using a selection algorithm which takes into account the current congestion values of the SCPs.

In yet another variant, instead of setting the Routing Indicator to 1, the SSP-SCCP translator sets the Routing Indicator to 0 (route on Global Title), and MTP sends the message via an intermediate node (not shown) which has SCCP translator functionality similar to the SCP-SCCP translator, and this intermediate node performs translation to the corresponding point code/SSN pair and sets the Routing Indicator to 1 for onward transmission to the SCP 16A.

Unless the context clearly requires otherwise, throughout the description and the claims, the words "comprise", "comprising" and the like are to be construed in an inclusive sense as opposed to an exclusive or exhaustive sense; that is to say, in the sense of "including, but not limited to".

What is claimed is:

1. In a communications network, wherein a source network unit conducts a new transaction for a function of that network by:
    (a) selecting a member of a respective function-associated pool of transaction-processing units, each having a service status of in-service (IS) and having a first network address for receipt of initial transaction signalling messages and a second network address for receipt of subsequent transaction signalling messages;
    (b) sending an initial transaction signalling message to that first network address of the selected member, and then sending subsequent signalling messages of that transaction to the second network address of the selected member;

a method of changing the service status of a particular transaction-processing unit of the pool to out-of-service (OOS), the method comprising:
    (c) changing the service status of the first network address of the particular member from IS to OOS;
    (d) continuing to process subsequent signalling messages received at the second network address of the particular transaction-processing unit in respect of transactions currently being processed by that particular transaction-processing unit; and
    (e) changing the service status of that particular transaction-processing unit from IS to OOS upon detecting actual or effectual completion of all such transactions currently being processed by that particular transaction-processing unit.

2. The method as claimed in claim 1 wherein (b) is performed only if the source network unit has ascertained that the service status of the first network address of the selected member is IS; and wherein (c) comprises sending a message to each potential source network unit indicating that the service status of the first network address of the particular member has changed from IS to OOS.

3. The method as claimed in claim 2 wherein (d) comprises broadcasting such a message to each potential source network unit.

4. The method as claimed in claim 2 wherein (d) comprises sending respective such messages to the potential source network units in stages.

5. The method as claimed in claim 1 wherein each transaction-processing unit possesses a respective Internet Protocol address having first and second associated port addresses and constituting the first and second network addresses of that transaction-processing unit.

6. A unit for use in a communications network, the unit comprising:
    an application arranged to provide a specific function;
    transaction signalling message handling means having first and second network addresses and arranged to handle transaction signalling messages in respect of that application in accordance with a transaction protocol;
    marking means responsive to a requirement for a change of service status of the unit from in-service (IS) to out-of-service (OOS) for marking the service status of the first network address as OOS;
    means for detecting that the unit is actually or effectively not currently processing any transactions; and
    means responsive to such a detection by the detecting means for changing the service status of the unit from IS to OOS,
    wherein the transaction signalling message handling means is arranged:
        to respond to receipt from a source network unit of the communications network of a transaction signalling message of which a called party address part includes the first network address, such a transaction signalling message being hereinafter referred to as an initial transaction signalling message for a transaction, by creating a respective transaction instance and storing in that transaction instance the calling party address of that initial transaction signalling message,
        to respond to an acknowledgment from the application in respect of a received initial transaction signalling message by creating, in accordance with the newly created transaction instance corresponding to that received initial transaction signalling message, a return transaction signalling message of which a calling party address part includes the second network address, and to respond to receipt from a source network unit of the communications network of a transaction signalling message of which a called party address part contains the second network address, such a transaction signalling message being hereinafter referred to as a subsequent transaction signalling message of an existing transaction, by processing that subsequent transaction signalling message in accordance with the stored transaction instance corresponding to that existing transaction.

7. The unit as claimed in claim 6 wherein the marking means is arranged to send a message to potential source network units of the communications network indicating that the service status of the first network address has changed from IS to OOS.

8. The unit as claimed in claim 7 wherein the marking means is arranged to broadcast such a message to each potential source network unit.

9. The unit as claimed in claim 7 wherein the marking means is arranged to send respective such messages to the potential source network units in stages.

10. The unit as claimed in claim 6 wherein the first and second network addresses are constituted by a single Internet Protocol address having first and second associated port addresses.

* * * * *